(12) United States Patent
van Delden et al.

(10) Patent No.: US 9,593,265 B2
(45) Date of Patent: Mar. 14, 2017

(54) ADHESIVE COMPOSITION

(71) Applicant: Cooperatie AVEBE U.A., Veendam (NL)

(72) Inventors: Anna Maria van Delden, Leek (NL); Johannes Cornelis Petrus Hopman, Makkum (NL)

(73) Assignee: COOPERATIE AVEBE U.A., Veendam (NL)

(*) Notice: Subject to any disclaimer, the term of this patent is extended or adjusted under 35 U.S.C. 154(b) by 0 days.

(21) Appl. No.: 15/048,432

(22) Filed: Feb. 19, 2016

(65) Prior Publication Data

US 2016/0168430 A1    Jun. 16, 2016

Related U.S. Application Data

(62) Division of application No. 13/876,186, filed as application No. PCT/NL2011/050654 on Sep. 27, 2011, now Pat. No. 9,328,267.

(30) Foreign Application Priority Data

Sep. 28, 2010 (EP) .................................... 10180979

(51) Int. Cl.
| | |
|---|---|
| *C09J 11/06* | (2006.01) |
| *C09J 103/02* | (2006.01) |
| *C09J 103/12* | (2006.01) |
| *B32B 7/12* | (2006.01) |
| *C08L 3/02* | (2006.01) |
| *C08L 3/12* | (2006.01) |

(52) U.S. Cl.
CPC .............. *C09J 103/02* (2013.01); *B32B 7/12* (2013.01); *C09J 11/06* (2013.01); *C09J 103/12* (2013.01); *C08L 3/02* (2013.01); *C08L 3/12* (2013.01)

(58) Field of Classification Search
CPC .......... C09J 103/02; C09J 103/12; C09J 11/06
See application file for complete search history.

(56) References Cited

U.S. PATENT DOCUMENTS

| 5,454,862 A | 10/1995 | Jansen et al. |
| 5,589,528 A | 12/1996 | Bogardy |
| 2003/0007984 A1 | 1/2003 | Euverink et al. |

FOREIGN PATENT DOCUMENTS

| EP | 0609952 A2 | 8/1994 |
| EP | 0675137 | 10/1995 |
| GB | 964799 | 7/1964 |
| WO | 9219690 | 11/1992 |
| WO | 2010015554 | 2/2010 |

OTHER PUBLICATIONS

K. W. Allen, Adhesives Based on Starch, Applied Science London, Chapter 10, vol. 7, p. 197-219, (1983).
Edward M. Petrie, Starch and Dextrin Based Adhesives, SpecialChem, (2004).
E. Dickinson et al., Food Macromolecules and Colloids, Royal Society of Chemistry p. 480-486 (1995).
Ernest F. Eastman et al., Polyolefin and Ethylene Copolymer-based Hot Melt Adhesives, Handbook of Adhesives, 3rd Edition, Chapter 23, p. 408-422 (1989).
Leo Kruger, Starch Based Adhesives, Handbook of Adhesives, 3rd Edition, p. 153-165 (1989).

*Primary Examiner* — Daniel Lee
(74) *Attorney, Agent, or Firm* — Hoffmann & Baron, LLP

(57) ABSTRACT

The invention provides for an adhesive composition that can both be used as melt adhesive composition and as drying adhesive composition. Such an adhesive composition comprises a thermoreversible gelling starch, a bonding starch and a plasticizer.

22 Claims, No Drawings

ADHESIVE COMPOSITION

CROSS-REFERENCE TO RELATED APPLICATIONS

This application claims the benefit of priority from U.S. Ser. No. 13/876,186, filed May 15, 2013, now allowed, which is a U.S. National Phase of, and Applicants claim priority from, International Application No. PCT/NL2011/050654, filed Sep. 27, 2011, and European Patent Application No. 10180979.6, filed Sep. 28, 2010, all of which are incorporated herein by reference in their entireties.

BACKGROUND OF THE INVENTION

The invention is directed to an aqueous adhesive composition as well as to a method for adhering a first substrate to a second substrate.

Various types of adhesive compositions are known that are suitable for adhering various substrates, such as paper and board.

Adhesives may be divided in groups by their method of adhesion. For example, drying adhesives (which can be further subdivided into solution and emulsion adhesives) and hot melt adhesives are two different groups of adhesives known in the art.

Drying adhesives set by drying. Drying increases the viscosity of the adhesives and increases the bond strength between two substrates glued with the adhesive. Drying adhesives are preferably water-based (waterborne). Drying adhesives can further be subdivided into adhesives wherein the adhering polymer is dissolved (solution adhesives) and polymer dispersion adhesives (emulsion adhesives).

Solution adhesives typically comprise hydrophilic polymers, such as natural polymers (for example starch, dextrin, cellulose derivatives, casein) or soluble synthetic polymers (for example polyvinyl alcohol), which polymers are dissolved in water. As the solvent evaporates, the adhesive sets. Due to their high affinity for water, the polymers in a solution adhesive release water very slowly. As a result, solution adhesives are generally relatively slow setting and take a longer drying period compared to emulsion adhesives. Solution adhesives are particularly suitable for the adhesion of porous substrates. The porosity of the substrate facilitates the diffusion of the solvent from solution adhesives, thereby enhancing drying speed.

Emulsion adhesives typically comprise a polymer dispersed in water. An emulsion adhesive comprises hydrophobic polymers, such as polyvinyl acetate (PVAc), dispersed in water. Emulsion adhesives may contain less solvent than solution adhesives, because the polymer is not dissolved, but merely dispersed and the water is repelled by the hydrophobic nature of the polymer. As a result, emulsion adhesives generally set faster compared to solution adhesives. Emulsion adhesives typically have a high solid content. Emulsion adhesives are frequently used in such industries as the woodworking and packaging industries.

An advantage of drying adhesives containing non-thermoplastic polymers such as natural carbohydrates is that they are not particularly sensitive to temperature. Such drying adhesives are able to provide a good bonding strength between two glued substrates at both low and high temperatures.

A further advantage of drying adhesives, in particular waterborne drying adhesives, is that they can often be environmentally friendly.

A further property of drying adhesives is that they set relatively slowly. This may to a certain degree be advantageous, because it allows for a certain assembly time of the two substrates to be glued. However, the setting time of drying adhesives, in particular waterborne drying adhesives, is typically long and may even be so long that it may give insufficient bonding in fast applications. Drying adhesives require one of the substrates to be water permeable to allow for drying to occur.

A further disadvantage of drying adhesives, in particular waterborne drying adhesives, is that they are typically vulnerable to microorganisms and/or may have poor moisture resistance.

Hotmelt adhesives (hotmelts) are adhesives that are solid at room temperature and become a fluid at elevated temperature. When a hotmelt adhesive is heated above its softening point, typically at 140-180° C., it becomes fluid and can be applied to a substrate. Upon cooling below the softening point the hotmelt solidifies and may bind two substrates together.

Some materials, such as plastics and gels, do not have a definite melting point. For such materials, a so-called softening point may be used to indicate the material's transition temperature from a solid or gel state to a fluid state. The softening temperature can be determined, for example, by the ring & ball method (ASTM E28-99), the Vicat method (ASTM-D1525 or ISO 306) or the Heat Deflection Test (ASTM-D648). The softening point is preferably determined by the ring & ball method. The softening point as determined by the ring & ball method is the temperature at which a standardized steel ball cannot be held by a disk of the material anymore. This method of determining the softening point is described in more detail in the experimental section below.

Hotmelts are typically thermoplastic adhesive compositions. A thermoplastic is an organic material that can be repeatedly softened by heating and hardened by cooling. Hotmelt adhesives are used in many branches of the adhesive industry, in particular in the packaging and bookbinding industry.

The advantage of hotmelt adhesives is that they typically provide for short setting times, e.g. below 5 seconds, such that the substrates need only be pressed together for a short time after glueing (a short pressing time). At the end of the pressing time, the adhesive strength should be high enough to hold the substrates together. Furthermore, hotmelts are able to bond many different types of substrates, including permeable substrates and non-permeable substrates.

A disadvantage of hotmelts is that they are inherently temperature sensitive. Hotmelts become soft at elevated temperatures and become brittle at low temperatures. At elevated temperatures hotmelts are susceptible to joint movement or creep, which can result in bond failure.

A further disadvantage of hotmelts is that they typically have a high application temperature of between 140-180° C. Such high temperatures may be undesirable with respect to energy consumption and operator safety and may further be undesirable to use in certain applications, for example when one of the substrates to be glued is a heat-sensitive substrate.

A further disadvantage of hotmelts is that the maximum amount of time between applying the adhesive on one substrate and application of the second substrate at which still a good bond is achieved ("open time") is short, which makes the time available for part adjustment limited. Part adjustment is the operation of adjusting the two substrates relative to each other. The operation of part adjustment is possible only for as long as the glue between the substrates has not fully set yet and thus allows for moving the substrates relative to each other. In order to increase the open time often more adhesive is applied than needed to achieve a suitable bond strength (see Irving Skeist, Chapter 23: Polyolefin and Ethylene Copolymer-based Hot Melt Adhesives, p 408-p 422, Handbook of Adhesives, Third Edition, 1989, Chapman & Hall). This solution is not desirable for obvious reasons.

Plasticizers have been used extensively to obtain hotmelts based on water soluble polymers, such as starch, which are not inherently thermoplastic. In particular, low molecular weight, water soluble compounds have been used as plasticizers, such as illustrated in U.S. Pat. No. 5,454,862, WO 92/19690 and GB-A 964 799.

A disadvantage of using plasticizers in such hotmelts is that plasticizers have a tendency to migrate under the influence of moisture, resulting in bleeding (visible smudging of the surface of the substrate) and bond failure due to brittleness and loss of cohesion.

Although nowadays hotmelts are solvent free systems based on synthetic polyolefins, the early hotmelt adhesives were based on ethyl cellulose and animal and hide glues and were waterborne. These were abandoned because they were suffering from disadvantages such as being unable to cope with higher machine speeds or having too low softening point and bad smell. The thermoplast based hotmelts provided 100% solid adhesives requiring no water transport, having no smell, and adhering to more diverse substrates.

U.S. Pat. No. 5,589,528 describes a hot melt adhesive based on modified water bearing gels having a softening point below approximately 43° C. The hot melt adhesive may comprise 50-70% natural organic material content (such as animal hide and bone, fish, blood and casein, soy, starch, cellulosics, etc.), 25-50 wt. % water. The hot melt adhesive may further comprise sugars and tackifiers, for example starch components.

A disadvantage of the composition described in U.S. Pat. No. 5,589,528 is that the softening point of the hotmelt is too close to room temperature, which will result in slow setting of the adhesive at room temperature. A further disadvantage is that the manufacture of the hotmelt is laborious and conducted in multiple steps.

WO 98/15347 is directed to a modified starch obtainable by treating amylose-containing starch in aqueous medium with an enzyme having α-1,4-α-1,4-glucosyl transferases activity. Such a modified starch can be used as an agent for forming a thermoreversible gel. The modified starch is suitable for many uses in which the property to form a thermoreversible gel can be useful or important, such as in foodstuffs, cosmetics, pharmaceutics, detergents, adhesives and drilling fluids. WO 98/15347 further describes an aqueous solution comprising 5% potato starch modified with glucosyl transferase, which solution shows the behaviour of a thermoreversible gel. Disadvantage of the composition of WO 98/15347 is that its gelling speed is slow. It takes hours for the gel to form, even at low temperatures such as 5° C. This makes the thermoreversible gel of WO 98/15347 unsuitable as an adhesive.

Another approach to obtain a thermoreversible gelling starch is provided in EP 0 372 184. In the process described, starch is partially debranched using enzymes with debranching activity. The starches obtained consist of a mixture of short chain amylose, partially debranched amylopectin and amylopectin in ratios depending on starting materials and processing conditions. The formation of gels using these starches is also too slow to be suitable as an adhesive.

SUMMARY OF THE INVENTION

Object of the invention is to provide an adhesive composition that may be used as a hot melt adhesive composition, which does not have one or more of the above-mentioned disadvantages of hot melt adhesive compositions.

A further object of the invention is to provide an adhesive composition that may be used as a drying adhesive composition, which does not have one or more of the above-mentioned disadvantages of drying adhesive compositions.

A further object of the invention is to provide an adhesive composition that can both be used as hot melt adhesive composition and a drying adhesive composition.

It is a further object to provide an adhesive composition that can not only be used immediately after preparation while still hot but also after cooling and reheating. Upon cooling, the composition solidifies and can be easily handled in any form as desired. The solidified composition can be heated again to regain the liquid composition provided excessive evaporation of moisture is avoided.

DETAILED DESCRIPTION OF THE INVENTION

At least one of the objects was met by providing an aqueous adhesive composition comprising a thermoreversible gelling starch and a bonding starch.

It has surprisingly been found that the presence of a bonding starch in the adhesive composition may decrease the setting time of the composition considerably. It was further surprisingly found that, while the presence of the bonding starch decreases the gelling time of the composition, it does not or at least not significantly influence the thermoreversible gelling character of the adhesive composition of the invention in a negative way.

It has further been surprisingly found that the adhesive composition of the invention is able to fixate additives, such as plasticizers. This is advantageous, because it prevents or at least decreases the undesirable release of additives from the gel, such as bleeding and other migration related problems found in hotmelts, and bond failure caused by such undesirable release.

An advantage of the adhesive composition is that it is easy to handle. The adhesive composition of the invention is typically prepared at such temperature that the ingredients can be properly mixed and dissolved, for example at a temperature of 50° C. or higher, preferably a temperature of 80° C. or higher. After preparation, the composition may be cooled and will solidify to a gel. The gel can be easily handled in any form as desired, which makes it easy to transport or store. To use the gel as an adhesive, it only has to be heated to above its softening point and can then be applied to a substrate.

A further advantage of the adhesive composition is that it is resistant to heat. In case the adhesive composition of the invention is applied to a substrate, the solvent can leave the composition, for example by evaporation or absorption by the substrate. Consequently, the adhesive composition may loose its thermoreversible property. This is desirable with respect to the heat-resistance of the bond between the substrates. Once the two substrates have been adhered together, the bonding strength between the substrates will not significantly decrease upon heating, even when the substrates would be heated above the softening point of the initial adhesive composition.

Thus, the composition according to the invention combines the fast setting of hotmelt adhesives with the beneficial "open times" (see herein below) and good heat resistance of dissolved starch adhesives. The compositions according to the invention can be used at a temperature below 100° C., which temperature is much safer for the operator than traditional hotmelt adhesives, which are typically used at temperatures well above 100° C. However, the adhesive composition of the invention has a sufficiently high softening point to facilitate rapid bond formation.

The term "thermoreversible gelling starch" as used herein refers to a modified starch that is capable of forming a thermally reversible gel when dispersed in water at a certain concentration. The suitable concentration to form a thermoreversible gel varies with the composition of the adhesive composition and the type of thermoreversible gelling starch used. Thermoreversible gelling starch may for example be obtained by certain enzymatic treatments of starch, such as described below.

The terms "thermoreversible gel" and "thermally reversible gel" may be used interchangeably and refer to a composition that is a liquid above a certain temperature and forms a gel when cooled below this temperature. The temperature is referred to as the softening point of the thermoreversible gel. The process of going from a liquid to a gel and vice versa is a reversible process. This means that a thermoreversible gel may be a solution above its softening point, forms a gel upon cooling and after re-heating again above its softening point reverts into a solution with similar viscosity and clarity as the initial solution. The term "thermoreversible gel" is an established term in the art, as for example explained in "Food Macromolecules and Colloids, eds. E. Dickinson and D. Lorient, Royal Society of Chemistry, Cambridge, 1995, p 480-486". Accordingly, the adhesive composition of the invention may be a thermoreversible gel, in particular when used as a hotmelt.

The term "bonding starch" as used herein refers to a starch that is capable of strengthening the adhesive bond and increasing the setting speed of the adhesive composition. The bonding starch may or may not gel, though not thermoreversibly. Thus, the bonding starch is not a thermoreversible gelling starch. Consequently, the bonding starch and thermoreversible gelling starch present in the adhesive composition cannot be the same starch. The bonding starch will increase solid content and contribute to bond formation with the substrates.

The term "solid content" as used herein refers to the amount of solids in the compositions based on the total amount of the composition. The compounds that are considered to be solids are typically all compounds in the adhesive composition other than the solvent and thus include modified starch, carbohydrates and salts. The non-solid content of the composition is typically the solvent, which in most cases only consists of water.

The term "open time" as used herein refers to the maximum amount of time between applying the adhesive on one substrate and application of the second substrate at which still a sufficiently strong bond can be formed.

The term "closed time" as used herein refers to the minimum amount of time it takes to form a sufficiently strong bond after the two substrates are applied to each other. During the closed time, the two substrates are held together, for example by pressing them against each other.

Therefore, the "closed time" may also be indicated as the "pressing time". These terms can be used interchangeably.

The term "setting time" as used herein refers to the time it takes for an adhesive composition to achieve a certain bond strength, sufficient to withstand disassembly of the substrates.

The bonding starch is preferably a degraded starch. A degraded starch has a smaller chain length compared to a starch that is not degraded. The reduction in chain length due to degradation leads to a decrease in viscosity of the starch when dissolved in water. This is advantageous, because the lower viscosity makes it possible to provide an adhesive composition with a higher solid content at a given viscosity, and thus a higher adhesive strength and/or faster setting time. However, on the other hand, a reduction in chain length may also lead to a reduction of the adhesive strength because the smaller molecules have less points of interaction with the substrates. As a result, there is an optimum in the extent to which the starch should be degraded to obtain the optimal adhesive strength. A skilled person taking the above into consideration will know how to achieve a suitable adhesive strength.

Suitable ways of degrading starch to obtain bonding starches include oxidation, e.g. using sodium hypochlorite of hydrogen peroxide as oxidizing agent, acid degradation, dextrinization, heat treatment, extrusion (such as extrusion cooking), or treatment with amylolytic enzymes such as amylases. The degraded starch may further be substituted to improve the stability of the product, e.g. by acetylation or hydroxyalkylation.

The bonding starch may for example be a maltodextrin preferably having a dextrose equivalent (DE) of less than 20, more preferably a DE of less than 5. Maltodextrins having such a low dextrose equivalent are referred to as "low DE maltodextrins". Low DE maltodextrin may be derived from starch. Preferably, the low DE maltodextrin is derived from starch containing more than 95 wt. % amylopectin, based on the total starch weight. This is advantageous, because these exhibit better stability and better adhesive properties due to their higher molecular weight and more branched fragments. In case the adhesive composition of the invention is used as a hotmelt, the bonding starch is preferably a maltodextrin starch, in particular a low DE maltodextrin, preferably obtained from starch comprising more than 95 wt. % amylopectin.

Preferably, the bonding starch is of medium stability. On the one hand, using a highly unstable starch as the bonding starch is not preferred, because it may result in a loss of thermoreversibility of the adhesive composition. Examples of highly unstable starches are fast retrograding starches. On the other hand, the bonding starch is preferably not highly stable, because highly stable bonding starches may inhibit gelling of the formulation. Examples of highly stable starches are hydroxypropylated starches with elevated degrees of substitution.

The bonding starch does not need to be a gelling starch, i.e. it does not need to be capable of forming a gel in an aqueous environment itself. In case the bonding starch is a gelling starch, it is not a thermoreversible gelling starch.

The concentration of the bonding starch in the adhesion composition is preferably 5-80 wt. %, more preferably 10-75 wt. %, even more preferably 30-70 wt. %, based on the total weight of the adhesive composition.

The starch from which the bonding starch is derived may originate from any suitable source of starch. For example, this starch may originate from a botanical source such as root or tuber starches (e.g. potato or tapioca starch), cereal and fruit starches (e.g. maize, rice, wheat or barley starches), or legume starches (e.g. pea or bean starches).

In one embodiment, the bonding starch is obtained from starch comprising at least 95 wt. % amylopectin.

Examples of thermoreversible gelling starches are starches that are modified such that anhydroglucose moieties are transferred from amylose parts to amylopectin parts of the starch, thus creating longer side chain amylopectin. Such a thermoreversible gelling starch can be obtained by treating amylose containing starch, typically in aqueous medium, with an enzyme having $\alpha$-1,4-$\alpha$-1,4-glucosyl transferase activity. Examples of such an enzyme are enzymes from the group of the $\alpha$-1,4-$\alpha$-1,4-glucosyl transferases, such as amylomaltase. More details regarding the treatment of amylose containing starch with an enzyme having $\alpha$-1,4-$\alpha$-1,4-glucosyl transferase activity can be found in WO 98/15347.

Another example of a thermoreversible gelling starch is partially degraded starch, for example starch comprising up to 80 wt. % short chain amylose and at least 20 wt. % partially debranched amylopectin. Such starch can be obtained by partially debranching starch by enzymes having debranching activity, such as a $\alpha$-1,6-D-glucanohydrolase. Examples of $\alpha$-1,6-D-glucanohydrolases are pullulanase and isoamylase. This treatment is described in EP 0 372 184.

A further example of thermoreversible gelling starch is a starch comprising 5-95 wt. % of a crosslinked starch, e.g. hydroxypropyl distarch phosphate (E1442), and 95-5 wt. % of a degraded starch, e.g. oxidized starch (E1404). Such a thermoreversible gelling starch is for example known from EP 1,146,795.

EP 0 675 137 describes an adhesive composition comprising a glucan having in its molecule one cyclic structure comprising at least 14 alpha-1, 4-glucosidic bonds. This glucan is not a gelling starch and the adhesive composition described in EP 0 675 137 is therefore not capable of forming a gel, let alone a thermoreversible gel.

The concentration of the thermoreversible gelling starch in the adhesive composition is preferably 1-60 wt. %, more preferably 2-40 wt. %, even more preferably 3-35 wt. %, based on the total weight of the adhesive composition.

The starch from which the thermoreversible gelling starch is derived may originate from any suitable source of starch. For example, this starch may originate from a botanical source such as root or tuber starches (e.g. potato or tapioca starch), cereal and fruit starches (e.g. maize, rice, wheat or barley starches), or legume starches (e.g. pea or bean starches).

The adhesive composition may further comprise one or more plasticizers. Plasticizers are widely used to modify the melting properties, to control brittleness and hardness of the hardened adhesive and to regulate the speed of drying. Common plasticizers include glycerine, glycols, sorbitol, glucose, and sugar, in particular sucrose. These types of plasticizers act as a hygroscopic agent to decrease the drying rate of the film. Plasticizers based on polyglycols, and sulfonated oil derivates lubricate the layers within the dried adhesive and, thus, impart flexibility. Urea and sodium nitrate plasticize by forming a solid solution with the dried adhesive. Good results have been obtained using sorbitol, glycerol, sodium nitrate or sucrose as plasticizer.

The content of the plasticizer in the adhesive composition may be 0.1-50 wt %, preferably 1-40 wt. %, more preferably 3-30 wt. %, based on the total weight of the adhesive composition.

The adhesive composition preferably comprises a low molecular weight sugar as a plasticizer. Low molecular weight sugars are effective, low cost, renewable and non-volatile solid plasticizers. The low molecular weight sugar may be selected from the group consisting of saccharose, glucose, fructose, maltose and other oligomeric sugar condensates, as well as their reduced forms such as sorbitol and mannitol. The content of the low molecular weight sugar in the adhesive composition may be 0-50 wt %, for example 1-15 wt. % or 2-10 wt. %, based on the total weight of the adhesive composition.

The adhesive composition may have a water content of 20-80 wt. %, preferably 30-70 wt. %, based on the total weight of the adhesive composition. Consequently, the adhesive composition may be referred to as an aqueous adhesive composition.

The adhesive composition of the invention is a thermoreversible gel. The softening point of the adhesive composition of the invention is typically higher than 40° C. For compositions requiring cooling, storage and melting prior to application of the glue, a softening point of 50-90° C. is preferred. Compositions which are to be used immediately after preparation may have a softening point above 100° C. The softening point of an adhesive composition can for example be increased by increasing the amount of gelling starch, using a less stable bonding starch and/or decreasing the amount of plasticizers (such as water or sugar).

The adhesive composition is a viscous liquid above its softening point. Preferably, the viscosity of the adhesive composition measured with a Rapid Visco Analyzer as described herein below is 10-30,000 RVU (Rapid Viscoanalyzer Units), more preferably 100-10,000 RVU, even more preferably 500-5,000 RVU at 80° C.

The setting time is the time it takes for an adhesive composition to achieve a certain bond strength, sufficient to withstand disassembly of the substrates. For example, a sufficient bond strength is considered to be a bond strength of 40-60 cJ. The setting time required to achieve certain bond strengths may be determined, for example by using the practical adhesion test described below. The adhesive composition of the invention may have a setting time of less than 15 seconds to bond strengths of 40-60 cJ as measured in the practical adhesion test. The bonding strength between two substrates adhered to each other by an adhesive composition increases as the adhesive composition hardens and/or dries. The setting time depends on many variables, such as the temperature, the amount of adhesive composition used and the substrate to which the adhesive composition is applied.

The setting time and other properties of an adhesive composition can be measured by the practical adhesion test. A standardized amount of adhesive is applied onto a standardized piece of Kraft paper. Kraft paper is paper produced from the chemical pulp of softwood processed by the Kraft process. It is strong and relatively coarse and usually has a grammage of 50-135 g/cm$^2$. After applying the adhesive to the first piece of Kraft paper, a second piece of Kraft paper is placed on top of the first and the two pieces of Kraft paper are pressed together. The time between applying the adhesive and placing the second paper (the open time) may vary. After a certain period of time wherein the adhesive is allowed to set (closed time), the strength of the bond formed between the papers is assessed by determination of the amount of work needed to pull the two pieces of Kraft paper apart. Specific ways in which the practical adhesion test may be conducted are described below in the 'Experimental Procedures' section.

The amount of work needed to pull the two pieces of Kraft paper apart (bonding strength) at a certain open time-closed time interval will be higher for compositions with shorter setting time (if all other conditions are kept the same).

The initial bonding strength may be determined by measuring the force needed to overcome the bond strength between the pieces of Kraft paper at a closed time of 0, 3 and 5 seconds. If this force is relatively high, e.g. higher than 40 cJoule, this is an indication that the bond can already withstand certain stress although it is not fully set yet.

At forces of 60 cJoule and higher, fibre tear and cohesive failure of the adherents are observed for most adhesives (unless they are pressure sensitive), which indicates that the bond can withstand full stress. Therefore, the closed time at 40 and 60 cJoule can be suitably used as a value to compare the setting time of different adhesive compositions. The setting time also depends on the amount of adhesive used, so the layer thickness needs to be specified to compare adhesives on fair playing ground.

For adhesive compositions based on starches, which are adhesive compositions comprising starch as the main bonding polymer, setting times are typically 30 seconds or more as measured by the practical adhesion test, using 60 μm of adhesive layer. Starch is considered to be the main bonding polymer in an adhesive composition when at least 50 wt. % of the total bonding polymer weight in the composition is starch, preferably at least 80 wt. %.

The adhesive composition of the invention may further comprise one or more additives.

The adhesive composition may for example comprise one or more additives selected from the group consisting of anti-foaming agents, tackifiers, rheology modifiers, fillers, anti-oxidants, water resistance modulators and preservatives.

The adhesive composition may further comprise a liquefier, for example a liquefier selected from the group of compounds comprising calcium chloride, urea, sodium nitrate, thiourea and guanidine salts. Liquefiers may reduce viscosity or may act as humectants to control open time and speed of drying.

The adhesive composition may further comprise a colloid stabilizer, such as soaps and sodium chloride, to retard the tendency of retrogradation.

The adhesive composition may further comprise a compound to increase the water resistance of the composition, such as polyvinyl alcohol, polyvinyl acetate blends, and thermosetting resins, such as urea formaldehyde or resorcinol formaldehyde.

The adhesive composition may further comprise mineral fillers, such as kaolin clay, calcium carbonate and titanium dioxide. Mineral fillers may be used at concentrations of 5-50%. These are used to reduce cost and control penetration into porous substrates.

The adhesive composition may further comprise a thixotropic agent, such as bentonite. Thixotropic agents may be used to control rheological properties.

The adhesive composition may further comprise additives such as preservatives, bleaches, and defoamers.

Suitable descriptions of starch and dextrin based adhesives can be found in Edward M. Petrie, Starch and Dextrin Based Adhesives, SpecialChem—May 12, 2004; Irving Skeist, Chapter 8: Starch Based Adhesives, p 153-165, Handbook of Adhesives, Third Edition, 1989, Chapman & Hall or Lazarus, D. M., "Adhesives Based on Starch", Chapter 10, Adhesives and Adhesion, Vol. 7, K. W. Allen, ed., Applied Science, London, 1983.

The invention is further directed to a method for adhering a first substrate to a second substrate comprising the steps of
providing an aqueous adhesive composition comprising a thermoreversible gelling starch; and
connecting the first and the second substrate using the adhesive composition, wherein the adhesive composition is in liquid form; and
cooling the adhesive composition, for example to a temperature below its softening point.

As described above, U.S. Pat. No. 5,589,528 describes a hot melt adhesive based on modified water bearing gels having a softening point below approximately 43° C. A disadvantage of this composition is that the softening point of the hotmelt is too close to room temperature. This may be disadvantageous in applications wherein substrates are bound at temperatures higher than 43° C., or even at 20° C., where the small temperature gap results in slow cooling and thus setting of the gel.

The method of the invention provides for adhering a first substrate to a second substrate using an adhesive composition having a softening point between 44 and 100° C. This was achieved by using an adhesive composition comprising a thermoreversible gelling starch and a bonding starch, in particular an adhesive composition comprising a thermoreversible gelling starch, a bonding starch and a plasticizer. Such starches are further described hereinabove. The adhesive composition used in the method of the invention may be an adhesive composition of the invention, as described hereinabove.

As already described above, the adhesive composition of the invention is typically prepared at such a temperature that the ingredients can be properly mixed and dissolved, for example at a temperature of 50° C. or higher, preferably a temperature of 80° C. or higher. Connecting the first and the second substrate using the adhesive composition is typically conducted with the liquid adhesive composition having a temperature of 50° C. or higher, preferably a temperature of 80° C. or higher.

The adhesive composition in liquid form in the second step may be freshly prepared. However, it may also be prepared from an adhesive composition in gel form that was prepared earlier and for example temporarily transported and/or stored in gel form.

The adhesive composition may be cooled to a temperature of 40° C. or lower. In particular, the adhesive composition is cooled to a temperature around room temperature, for example to a temperature between 0 and 30° C.

The substrates may be polar substrates, such as paper, cardboard or wood, or non-polar substrates. Preferred are substrates where at least one is water-permeable. This has the advantage that water leaves the adhesive composition upon setting, which makes the assembly more resistant to heat.

The invention will be further illustrated by the following examples.

Experimental Procedures:

Preparation of Basic Formulation

A closed, 2 liter steel laboratory cooking vessel (having an internal diameter of 13.5 cm and a height of 15.5 cm measured on the inside of the vessel) with jacket heating, fitted with a matching anchor stirrer is put on a heating plate and the jacket is filled with cold water. The anchor stirrer has a width of 12 cm measured at its bottom and comprises two anchor arms parallel to the rotation axis of the stirrer, which arms have an internal diameter of 0.9 cm and a height of 9 cm. The liquid components (i.e. water and any liquid or dissolved additives) are added and a mixture of the solid components (i.e. the bonding starch, the gelling starch and any solid additives) is added while stirring at 150 rpm. The total amount of composition was between 400 and 800 g. The heating plate is turned on to maximum temperature (300° C.) and the solution is heated, whilst stirring at maximum 150 rpm or lower if the viscosity of the solutions makes this necessary, until the water in the jacket starts to boil. The jacket is flushed with water for 15 seconds and the heating plate is turned off. Additionally the solution is stirred for 20 minutes at 150 rpm. Next the jacket is flushed for 15 seconds again and the adhesive is poured into two glass jars which are then closed with a well fitting lid. One glass jar is stored in an oven of 100° C. to determine the adhesive properties directly after preparation, the other glass jar is stored at room temperature for at least one day to determine the solidifying and melting properties as well as the adhesive properties after re-melting.

Description of Measurements

RVA Viscosity—

With a Rapid Visco Analyser (RVA, type 4) the viscosity and the viscosity temperature profile of the prepared adhesive is determined directly after preparation and/or after re-melting. In the standard one way disposable cup 28 gram of the hot liquid adhesive is added. Subsequently the cup is fitted with a standard paddle, inserted into the RVA and the viscosity in RVU (Rapid Viscoanalyzer Units) is determined according to the following profile:

start temperature 95° C.,
heating for 2 minutes at 95° C. without stirring,
heating for 3 minutes at 95° C. whilst stirring with 50 rpm.
cooling down, whilst stirring with 50 rpm, with 2° C. per minute till 10° C. The viscosity recorded at 80° C. is given in Tables 1-4.
keeping at 10° C., whilst stirring with 50 rpm, for 5 minutes.

The test is stopped automatically if the viscosity becomes higher than 70000 RVU.

Practical Adhesion (Setting Time)—

The practical adhesion is determined according to the pulling test method that is performed with a Fipago-Adhesion tester (system PKL). The test is performed in a conditioning room capable of maintaining a relative humidity of 50±2% at 23±1° C. The paper adherents are stored under the same conditions. The adhesive is tested 1-3 hours after preparation and after re-melting at least 1 day after preparation. The adhesive tested has a temperature of 80±5° C.

A thin film (standard 60 μm) of the hot solution is applied on the sieve side of a standard Kraft paper sample (dimensions: 70 g/m², 200×30 mm) by means of a wire winded rod which is also heated to the same temperature as the adhesive (80±5° C.). Immediately the glued paper is placed on top of another Kraft paper (dimensions: 200 g/m², e.g. 100×55 mm) and adhered (felt side).

In particular, the application of the hot solution on Kraft paper and gluing it to another Kraft paper may be conducted as follows: a thin film (standard 60 μm) of the hot solution may be applied on the smooth side of standard Kraft paper [Natural machine-glazed Kraft paper (one smooth and shiny side, one matt side) Manufacturer: Sopal Doetinchem, The Netherlands; Gurley porosity: 72 s; PPS smoothness (smooth side): 3.42 μm; Cobb $^{60}$: 24 g/m²; Grammage: 85 g/m²; Dennison wax test: 18; dimensions 30×200 mm] by means of a wire winded rod which is also heated to the same temperature as the adhesive (80±5° C.), after which the glued paper is immediately adhered on top of another Kraft paper [Pitea Royal Brown, Manufacturer: Kappa Smurfit, Sweden; Supplier: Fipago, The Netherlands (Fipago 2006 kraftline); Grammage: 200 g/m²; Cobb $^{1800}$: 86 g/m²; Dennison wax test: 18; dimensions: 60×100 mm] by means of a metal pressure roller (500 gram).

The open time in this experiment is set at 0 seconds. The closed time is varied standard in the interval 0-20 seconds but can be longer if fibre tear has not yet occurred. Every adhesive is characterized by at least five different closed times, yielding a more or less sigmoid curve. This curve represents the work needed to overcome the bond strength as function of closed time. Results are given as work in cJ at [x,y], where x is the open time used in seconds, and y the closed time in seconds. The pieces of Kraft paper are examined after the measurement to evaluate the quality of the bond formation, in particular adhesive transfer to the second piece of Kraft paper.

If the adhesive transfer to the second substrate is insufficient, indicating a crossing of the open time, then the amount of adhesive applied can be raised by using a different wire winded rod. Subsequently the amount of adhesive applied can also be lowered, by using a different wire winded rod, to determine the relation adhesive amount/setting time or adhesive amount/open time.

Practical Adhesion (Wet Tack)—

The wet tack is determined according to the pulling test method that is performed with a Fipago-Adhesion tester (system PKL). The test is performed in a conditioning room capable of maintaining a relative humidity of 50±2% at 23±1° C. The paper adherents are stored under the same conditions. The adhesive is tested 1-3 hours after preparation and after re-melting at least 1 day after preparation. The adhesive tested has a temperature of 80±5° C. A thin film (standard 60 μm) of the hot solution is applied on the on the smooth side of standard Kraft paper [Natural machine-glazed Kraft paper (one smooth and shiny side, one matt side) Manufacturer: Sopal Doetinchem, The Netherlands; Gurley porosity: 72 s; PPS smoothness (smooth side): 3.42 μm; Cobb $^{60}$: 24 g/m²; Grammage: 85 g/m²; Dennison wax test: 18; dimensions 30×200 mm] by means of a wire winded rod which is also heated to the same temperature as the adhesive (80±5° C.).

After the open time is exceeded (standard 5 seconds for wet tack) the glued paper is adhered on top of another Kraft paper [Pitea Royal Brown, Manufacturer: Kappa Smurfit, Sweden; Supplier: Fipago, The Netherlands (Fipago 2006 kraftline); Grammage: 200 g/m²; Cobb $^{1800}$: 86 g/m²; Dennison wax test: 18; dimensions: 60×100 mm] by means of a metal pressure roller (500 gram). The closed time is set at 3 seconds. Results are given as work in cJ at [5,3], where 5 is the open time used in seconds, and 3 the closed time in seconds.

The pieces of Kraft paper are examined after the measurement to evaluate the quality of the bond formation, in particular adhesive transfer to the second piece of Kraft paper. If the adhesive transfer to the second substrate is insufficient, indicating a crossing of the open time, then the amount of adhesive applied can be raised by using a different wire winded rod. Subsequently the amount of adhesive applied can also be lowered, by using a different wire winded rod, to determine the relation adhesive amount/wet tack or adhesive amount/open time.

Dry Solids—

The concentration of the adhesive is determined directly after preparation by means of a refractometer (Atago AX-1000), and presented as a brix value.

Softening Point (Ring & Ball or R&B)—

In the standard R&B apparatus, which is described in e.g. ASTM E-28-99 (2009), rings and steel balls are used to determine the softening point. The ring-and-ball softening point is defined as the temperature at which a disk of the sample held within a horizontal ring is forced downward a distance of 1 inch (25.4 mm) under the weight of a steel ball as the sample is heated at a certain rate in a glycerol bath. The ring is placed on a small glass plate (size: 10×6×0.35 cm) and filled with freshly prepared hot liquid adhesive avoiding entrapment of air bubbles. A second small glass plate is put directly after filling on the ring. The filled ring is stored between the two glass plates for at least 24 hours. The filled ring is taken out of the two glass plates and put immediately in the R& B apparatus. The steel ball is put on the filled ring and the apparatus is then placed in a beaker glass with stirring bar filled with glycerol at 25±5° C. The beaker with the apparatus is put on a heating device with magnetic stirring. A digital thermometer is put in the apparatus. The temperature of the heating device is adjusted such that the average temperature increase is 4° C. per minute. The magnetic stirring is adjusted such that a good circulation of the glycerol, leading to an evenly divided temperature, is assured. The temperature at which the steel ball touches the second horizontal plate of the apparatus is recorded as the R&B softening point.

Heat Resistance—

Water resistant 120 grams Kraft paper (20×25 cm) is conditioned at least 24 hours at a relative humidity of 50±2% and temperature of 23±1° C. A piece of Kraft paper is put on top of a glass plate (size: 40×30×0.35 cm). Onto the Kraft paper a line of the hot liquid adhesive is poured in an amount of about 6 g/m, about 5 cm from the bottom of the long side of the paper. A second piece of the Kraft paper is put on immediately, followed by a second glass plate. Subsequently, a weight of 10 kg is placed on top of the glass plate for 10 minutes. After these 10 minutes, the conglutinated papers are conditioned for at least 24 hours at a relative humidity of 50±2% and temperature of 23±1° C.

A second set made in the same manner using an adhesive line of about 11 g/m.

The conglutinated papers are cut into strips of 3 cm wide, perpendicular to the adhesive line, the two outer strips are not used. The ends of the strips are folded back and stapled to the strip just above the glued area to form loops.

Six strips per test bond are hung from the ceiling of an oven by one loop and to the other loop a weight of 200 g is attached. The temperature of the oven is set at 30° C. and after 10 minutes the strips evaluated and checked whether the bonds hold. The temperature is raised to 35° and after 10 minutes checked again. This procedure is repeated until 100° is reached and hereafter the temperature is raised by increments of 10° until 200°.

The temperature, at which a bond breaks, is recorded. The lowest and highest values are discarded and the heat resistance is the mean of the remaining four.

Re-Melting—

The adhesive in the glass jar that was stored at room temperature for at least 24 hours is put in an oven of 100° C. If re-melting occurs, the appearance, RVA viscosity and setting time are determined.

Example 1

Preparation of Adhesive Compositions

In table 1, three recipes according to the invention have been prepared following the procedure given above. Eliane MD2 is a maltodextrin with DE of about 2 based on waxy potato starch and functions as bonding starch, Etenia 457 is an amylomaltase treated, thermoreversible gelling potato starch, both products from AVEBE. Synperonic L61 (from Uniqema Chemie) is an anti-foam agent. Product 1 has a setting time to 40 cJ of just over 3 seconds, and of 10 seconds to 60 cJ. Replacing part of the sugar (i.e. sucrose) and gelling starch with bonding starch results in faster setting times (compare recipes 1 and 2). All products solidify upon cooling. Lowering the amount of gelling starch lowers the softening point (R&B) to below 100 C, enabling product 3 to melt again to an adhesive with properties very similar to the original properties (compare recipes 3 with recipes 1 and 2).

TABLE 1

| | Recipe number | | |
|---|---|---|---|
| | 1 | 2 | 3 |
| Water (total quantity before cooking) | 48.55 | 48.55 | 48.55 |
| ELIANE MD 2 (g dry substance) | — | 13.30 | 42.70 |
| ETENIA 457 (g dry substance) | 33.60 | 33.60 | 4.20 |
| Sugar (sucrose) (g dry substance) | 17.80 | 4.50 | 4.50 |
| Synperonic L 61 (g as is) | 0.05 | 0.05 | 0.05 |
| *Directly after preparation* | | | |
| Viscosity 80° C. [RVU] | 2690 | 3553 | 736 |
| Refraction [%] | 54.4 | 55.7 | 55.1 |
| *Adhesive amount: 60 μm* | | | |
| Wet tack [cJ] [5, 3] | 21.5* | 45* | 36.5 |
| *Adhesion* | | | |
| Work at [0, 0] [cJ] | 30* | 48* | 21 |
| Work at [0, 3] [cJ] | 39* | 56.5* | 38 |
| Work at [0, 5] [cJ] | 45* | 73* | 50 |
| Setting time till 40 cJ [s] | 3-4 | 0 | 3-4 |
| Setting time till 60 cJ [s] | 10 | 4 | 8 |
| *Adhesive amount: 200 μm* | | | |
| Wet tack [cJ] [5, 3] | 54 | 65.5 | 42 |
| *Adhesion* | | | |
| Work at [0, 0] [cJ] | 43.5 | 60 | 24 |
| Work at [0, 3] [cJ] | 51 | 68 | 37 |
| Work at [0, 5] [cJ] | 64 | 80 | 46 |
| Setting time till 40 cJ [s] | 0 | 0 | 3-4 |
| Setting time till 60 cJ [s] | 4-5 | 2-3 | ±7-8** |
| R & B [° C.] | 117.6 | 114.5 | 81.2 |
| Appearance after 24 hours at room temperature | Hard gel | Hard gel | Hard gel |
| *After heating at 100° C.* | | | |
| Appearance | Hard gel | Hard gel | Fluid |
| Viscosity 80° C. [RVU] | Not fluid | Not fluid | 3007 |
| Wet tack [cJ] [5, 3] | | | 30.5* |
| *Adhesion* | | | |
| Work at [0, 0] [cJ] | | | 20 |
| Work at [0, 3] [cJ] | | | 35 |
| Work at [0, 5] [cJ] | | | 46 |
| Setting time till 40 cJ [s] | | | 4-5 |
| Setting time till 60 cJ [s] | | | 9 |

*Diminished adhesive transfer
**Indication (no measurement to 60 cJ)

Example 2

Effect of Thermoreversible Gelling Starch Type

In Table 2 (see next page) the type of thermoreversible gelling starch is varied. It is shown that instead of Etenia 457, Perfectagel MPT or Gel 'n'Melt can be used. Perfectagel MPT is a modified potato starch containing hydroxypropyl distarch phosphate (E1442) and oxidized potato starch (E1404). It is a product from AVEBE often used in meltable imitation cheese. Gel 'n'Melt is a partially debranched waxy corn starch from National Starch.

Example 3

The compositions according to the invention have an open time which is much longer than synthetic hotmelts known in the art. This is illustrated by the adhesive transfer in the practical adhesion test as given in Table 3, which improves with layer thickness (a thicker layer cools slower). Also given are adhesion strengths at [0,3] and [5,3]. If the open time of the adhesive is less than 5 seconds, there is limited adhesive transfer, and the strength at [5,3] is less than [0,3]. The increased open time facilitates reduction of the adhesive layer thickness, and thus reduction of amount of adhesive needed to bond the substrates. Two formulations according to the invention are compared to a commercial packaging hotmelt, Swift B569/38 from Forbo Adhesives. The commercial hotmelt has an open time which is shorter than the time needed to apply the glue onto the Kraft paper and add the second layer of Kraft paper in the test. Furthermore the heat resistance is improved tremendously with the formulations according to the invention compared to the synthetic hotmelt.

TABLE 2

|  | Recipe number | | |
| --- | --- | --- | --- |
|  | 4 | 5 | 6 |
| Gelling starch used | ETENIA 457 | PERFECTAGEL MPT | GEL 'N' MELT |
| Water (g added) | 50 | 50 | 50 |
| ELIANE MD 2 (g as is) | 50 | 50 | 50 |
| Gelling starch (g as is) | 5 | 5 | 5 |
| Sugar (sucrose) (g as is) | 5 | 5 | 5 |
| Synperonic L 61 (g as is) | 0.05 | 0.05 | 0.05 |
| *Directly after preparation* | | | |
| Viscosity 80° C. [RVU] | 1127 | 2111 | 1089 |
| Refraction [%] | 55.4 | 56.3 | 55.1 |
| Wet tack [cJ] [5, 3] | 43* | 46* | 40* |
| Adhesion | | | |
| Work at [0, 0] [cJ] | 29 | 29 | 29 |
| Work at [0, 3] [cJ] | 48 | 50 | 44 |
| Work at [0, 5] [cJ] | 56 | 54 | 60 |
| Setting time till 40 cJ [s] | 2-3 | 2-3 | 2-3 |
| Setting time till 60 cJ [s] | 6-7 | 6-7 | 5 |
| Appearance after 24 hours at room temperature | Hard gel | Hard gel | Hard gel |
| *After heating at 100° C.* | | | |
| Appearance | Fluid | Fluid | Fluid |
| Viscosity 80° C. [RVU] | 1446 | 2866 | 1807 |
| Wet tack [cJ] [5, 3] | 43* | 41* | 37* |
| Adhesion | | | |
| Work at [0, 0] [cJ] | 29.5 | 33 | 28 |
| Work at [0, 3] [cJ] | 43 | 43 | 42 |
| Work at [0, 5] [cJ] | 53 | 60 | 56 |
| Setting time till 40 cJ [s] | 2-3 | 2-3 | 2-3 |
| Setting time till 60 cJ [s] | 6-7 | 5 | 6 |

*Diminished adhesive transfer

TABLE 3

|  | Recipe | | Synthetic hotmelts |
| --- | --- | --- | --- |
|  | 7 | 8 | Swift B 569/38 |
| Water (total before cooking) | 48.55 | 48.55 | |
| ELIANE MD 2 (g dry) | 42.70 | 13.30 | |
| ETENIA 457 (g dry) | 4.20 | 33.60 | |
| Sugar (sucrose) (g dry) | 4.50 | 4.50 | |
| Synperonic L 61 (g as is) | 0.05 | 0.05 | |
| *Directly after preparation* | | | |
| Viscosity 80° C. [RVU] | 719 | 5755 | 1300@ |
| Refraction [%] | 55.8 | 55.4 | Not relevant |
| *Adhesive layer: 20 μm* | | | |
| Wet tack [cJ] [0, 3] | 47.5 | 70 | |
| Adhesive transfer [0, 3] | Moderate | Poor | |
| Wet tack (cJ) [5, 3] | 19 | 55 | |
| Adhesive transfer [5, 3] | Poor | Poor | |
| *Adhesive layer: 40 μm* | | | |
| Wet tack [cJ] [0, 3] | 53 | 77 | |
| Adhesive transfer [0, 3] | Good | Moderate | |
| Wet tack (cJ) [5, 3] | 31 | 66 | |
| Adhesive transfer [5, 3] | Moderate | Poor | |
| *Adhesive layer: 60 μm* | | | |
| Wet tack [cJ] [0, 3] | 47.5 | 71 | |
| Adhesive transfer [0, 3] | Good | Moderate | |
| Wet tack (cJ) [5, 3] | 42 | 57 | |
| Adhesive transfer [5, 3] | Good | Poor | |
| *Adhesive layer: 80 μm* | | | |
| Wet tack [cJ] [0, 3] | 43.5 | 65 | |
| Adhesive transfer [0, 3] | Good | Good | |
| Wet tack (cJ) [5, 3] | 41.5 | 56.5 | |
| Adhesive transfer [5, 3] | Good | Moderate | |
| *Adhesive layer: 200 μm* | | | |
| Wet tack [cJ] [0, 3] | 37 | 67.5 | |
| Adhesive transfer [0, 3] | Good | Good | None |
| Wet tack (cJ) [5, 3] | 42 | 65.5 | |
| Adhesive transfer [5, 3] | Good | Good | None |
| R & B [° C.] | 81.2 | 114.5 | 84.9 |
| Heat resistance [° C.] | | | |
| Adhesive amount 6 g/m | >180 | >180 | 45 |
| Adhesive amount 11 g/m | >170 | >170 | 47.5 |

@Specified in product technical data sheet, at 160° C.

Example 4

In the Table 4 a number of bonding starches are used in adhesive compositions according to the invention using the composition of Example 2 but cooked with less water evaporation resulting in a slightly lower solids content. The waxy potato maltodextrin Eliane MD2 (recipe 9) gives the best combination of setting speed and melting behaviour. The waxy potato starch based dextrin B2128 gives comparable properties to Eliane MD2 (recipe 10), though it is slightly more difficult to re-melt. Using an acid degraded, unstable bonding starch like MS1168 (recipe 11) increases the setting speed but diminishes the meltability of the composition significantly. The use of Solfarex A55, an oxydized, hydroxyethylated (degree of substitution 0.10-0.12) potato starch results in a composition as fast as MS1168 yet as meltable as B2128 (recipe 12).

Preparation of B 2128:

In a Hobart mixer, 500 g (400 g dry matter) of amylopectin potato starch (amylopectin content >98 wt. %) was mixed with 71 g solution of 0.28 g of HC1 in water for 30 minutes. The mixture was equilibrated at 4-8° C. for 16 hours and dried to 4% moisture in a Retsch fluid bed dryer in three steps of 15 minutes with temperatures of 60, 60 and 90° C. respectively. The mixture was subsequently heated at 90° C. in a rotating reactor for 1 hour yielding an off white powder with a moisture content of 3%.

Preparation of MS 1168:

In a beaker of 2 liter, 472 g (405 g dry matter) of amylopectin potato starch (amylopectin content >98 wt. %) was suspended in water to a concentration of 39 wt. %.

The mixture was heated to 45° C. and then 50 ml 10 N H2SO4 was added. The mixture was stirred at 45° C. for 17 hours and afterwards the mixture was dewatered and washed with 2.5 liter water. After drying in a stove at 35° C. for 1 night the product was grinded to a powder.

TABLE 4

| | Recipe | | | |
|---|---|---|---|---|
| | 9 | 10 | 11 | 12 |
| Starch used | ELIANE MD 2 | B 2128 | MS 1168 | SOLFAREX A 55 |
| Directly after preparation | | | | |
| Viscosity 80° C. [RVU] | 666 | 673 | 2217 | 1107 |
| Refraction [%] | 53.8 | 52.6 | 53.5 | 51.4 |
| Wet tack [cJ] [5, 3] Adhesion | 35 | 35 | 38 | 48 |
| Work at [0, 0] [cJ] | 18 | 16 | 38.5 | 26.5 |
| Work at [0, 3] [cJ] | 32 | 35 | 46 | 50 |
| Work at [0, 5] [cJ] | 41.5 | 42 | 55 | 61 |
| Setting time till 40 cJ [s] | 5 | 5 | 0-3 | 2 |
| Setting time till 60 cJ [s] | 9-10 | 9 | 6-7 | 5 |
| Appearance after 24 hours at room temperature | Hard gel | Hard gel | Hard gel | Hard gel |
| After heating at 100° C. | | | | |
| Appearance | Fluid | Just fluid | Just fluid | Just fluid |
| Viscosity 80° C. [RVU] | 1157 | 3906 | 5167 | 3715 |
| Wet tack [cJ] [5, 3] Adhesion | 32 | 31 | 50 | 47 |
| Work at [0, 0] [cJ] | 14 | 18 | 39 | 29 |
| Work at [0, 3] [cJ] | 28.5 | 31 | 54 | 47.5 |
| Work at [0, 5] [cJ] | 38 | 38 | 63 | 57 |
| Setting time till 40 cJ [s] | 5-6 | 5-7 | 0-3 | 2 |
| Setting time till 60 cJ [s] | 10-11 | 10-12 | 5 | 6 |

Example 5

Effect of Plasticizer Type

In Table 5 the type of plasticizer is varied. As gelling starch ETENIA 457 (see Example 1) and as bonding starch MS 1168 from Example 4 is used. To improve the meltability a formulation with dry solids lower than in Table 4 is used. It is shown that besides Sucrose also Sorbitol, Glycerol or sodium nitrate can be used. Sorbitol is D-Sorbitol (from Prolabo), Glycerol is EMPROVE exp (from Merck), Sodium nitrate is sodium nitrate p.a. (from Merck).

TABLE 5

| | Recipe | | | |
|---|---|---|---|---|
| | 13 | 14 | 15 | 16 |
| Plasticizer used | Sugar (sucrose) | Sorbitol | Glycerol | Sodium nitrate |
| Water (g added) | 53.5 | 53.5 | 53.5 | 53.5 |
| ETENIA 457 (on dry solids) | 4.1 | 4.1 | 4.1 | 4.1 |
| MS 1168 (on dry solids) | 37.9 | 37.9 | 37.9 | 37.9 |
| Plasticizer (g as is) | 4.5 | 4.5 | 4.5 | 4.5 |
| Directly after preparation | | | | |
| Viscosity 80° C. [RVU] | 1772 | 1478 | 1315 | 1438 |
| Refraction [%] | 50.7 | 50.5 | 50.0 | 49.9 |
| Wet tack [cJ] [5, 3] Adhesion | 42 | 42 | 41 | 47 |
| Work at [0, 0] [cJ] | 34 | 34 | 30 | 34 |
| Work at [0, 3] [cJ] | 46 | 43 | 42 | 42 |
| Work at [0, 5] [cJ] | 51.5 | 50 | 48 | 54 |
| Setting time till 40 cJ [s] | 2-3 | 2-3 | 2-3 | 2-3 |
| Setting time till 60 cJ [s] | 7-8 | 8-9 | 8-9 | 7-8 |
| Appearance after 24 hours at room temperature | Hard gel | Hard gel | Hard gel | Hard gel |
| After heating at 100° C. | | | | |
| Appearance | Liquid | Liquid | Liquid | Liquid |
| Viscosity 80° C. [RVU] | 2107 | 1706 | 1840 | 2254 |
| Wet tack [cJ] [5, 3] Adhesion | 35* | 36* | 36 | 40 |
| Work at [0, 0] [cJ] | 31.5 | 29 | 28 | 27 |
| Work at [0, 3] [cJ] | 47.5 | 42 | 36 | 41.5 |
| Work at [0, 5] [cJ] | 57 | 46.5 | 44 | 48 |
| Setting time till 40 cJ [s] | 2-3 | 2-3 | 4 | 2-3 |
| Setting time till 60 cJ [s] | 6-7 | 8-9 | 9-10 | 8-9 |

*Diminished adhesive transfer

Example 6

In table 6 the effect of the amount of plasticizer in the formulation is illustrated. As gelling starch ETENIA 457, as bonding starch MS 1168 from example 4 and 5 and as plasticizer Sugar (i.e. sucrose) or Sorbitol is used. The recipe in example 5 is used as starting formulation to which additional plasticizer is added resulting in recipes 17 till 20 with consequently higher dry solids. By increasing the dry solids with additional amounts of sucrose or sorbitol the meltability of the formulation remains good. However increasing amounts of sucrose or sorbitol in the formulation lengthens the setting speed (especially the time needed till 60 cJ).

TABLE 6

| | Recipe | | | | | |
|---|---|---|---|---|---|---|
| | 13 | 17 | 18 | 14 | 19 | 20 |
| | Plasticizer used | | | | | |
| | Sugar (sucrose) | Sugar (sucrose) | Sugar (sucrose) | Sorbitol | Sorbitol | Sorbitol |
| Water (g added) | 53.5 | 51.7 | 49.4 | 53.5 | 51.7 | 49.4 |
| ETENIA 457 (on dry solids) | 4.1 | 3.9 | 3.8 | 4.1 | 3.9 | 3.8 |
| MS 1168 (on dry solids) | 37.9 | 36.5 | 31.5 | 37.9 | 36.5 | 31.5 |
| Plasticizer (g as is) | 4.5 | 7.9 | 15.3 | 4.5 | 7.9 | 15.3 |
| Directly after preparation | | | | | | |
| Viscosity 80° C. [RVU] | 1772 | 1901 | 1381 | 1478 | 1754 | 960 |
| Refraction [%] | 50.7 | 53.0 | 54.4 | 50.5 | 52.7 | 54.6 |
| Wet tack [cJ] [5, 3] | 42 | 36.5* | 43 | 42 | 39 | 38 |
| Adhesion | | | | | | |
| Work at [0, 0] [cJ] | 34 | 33 | 35 | 34 | 34 | 29 |
| Work at [0, 3] [cJ] | 46 | 41 | 45 | 43 | 41.5 | 38 |
| Work at [0, 5] [cJ] | 51.5 | 47.5 | 48 | 50 | 48 | 44 |
| Setting time till 40 cJ [s] | 2-3 | 2-3 | 2-3 | 2-3 | 2-3 | 4-5 |
| Setting time till 60 cJ [s] | 7-8 | 9-10 | 12-13 | 8-9 | 11-12 | 14-15 |
| Appearance after 24 hours at room temperature | Hard gel | Hard gel | Hard gel | Hard gel | Hard gel | Hard gel |
| After heating at 100° C. | | | | | | |
| Appearance | Liquid | Liquid | Liquid | Liquid | Liquid | Liquid |
| Viscosity 80° C. [RVU] | 2107 | 2999 | 2429 | 1706 | 2306 | 1355 |
| Wet tack [cJ] [5, 3] | 35* | 40* | 35* | 36* | 40* | 34* |
| Adhesion | | | | | | |
| Work at [0, 0] [cJ] | 31.5 | 33.5 | 31.5 | 29 | 34 | 29 |
| Work at [0, 3] [cJ] | 47.5 | 44 | 42 | 42 | 43 | 39 |
| Work at [0, 5] [cJ] | 57 | 50 | 46.5 | 46.5 | 48.5 | 42 |
| Setting time till 40 cJ [s] | 2-3 | 2-3 | 2-3 | 2-3 | 2-3 | 4-5 |
| Setting time till 60 cJ [s] | 6-7 | 9-10 | 13-14 | 8-9 | 11-12 | 15 |

*Diminished adhesive transfer

The invention claimed is:

1. Aqueous adhesive composition comprising a thermoreversible gelling starch, a bonding starch and a plasticizer, wherein the adhesive composition is thermoreversible, wherein the adhesive composition loses its thermoreversibility when the adhesive composition is set by drying, wherein the composition has a water content of at least 30 wt. %.

2. Aqueous adhesive composition according to claim 1, wherein the thermoreversible gelling starch is obtained from an amylose-containing starch, which starch has been treated with an enzyme having α-1,4-α-1,4-glucosyl transferase activity.

3. Aqueous adhesive composition according to claim 1 wherein the thermoreversible starch is obtained by partial debranching of a starch.

4. Aqueous adhesive composition according to claim 3, wherein the thermoreversible starch is obtained by treating a starch with α-1,6-D-glucanohydrolase.

5. Aqueous adhesive composition according to claim 3, wherein the thermoreversible starch comprises up to 80 wt. % short chain amylose and at least 20 wt. % partially debranched amylopectin.

6. Aqueous adhesive composition according to claim 1, wherein the thermoreversible gelling starch comprises 5-95 wt. % of a crosslinked starch and 95-5 wt. % of a degraded starch.

7. Aqueous adhesive composition according to claim 1, wherein the bonding starch is a degraded starch.

8. Aqueous adhesive composition according to claim 7, wherein the bonding starch is derived from starch containing more than 95 wt. % amylopectin, based on the total starch weight.

9. Aqueous adhesive composition according to claim 1, wherein the bonding starch is a low dextrose equivalent maltodextrin having a dextrose equivalent of less than 20.

10. Aqueous adhesive composition according to claim 1, wherein the plasticizer is a low molecular weight sugar.

11. Aqueous adhesive composition according to claim 10, wherein the plasticizer is selected from the group consisting of sorbitol, mannitol and sucrose.

12. Aqueous adhesive composition according to claim 1, wherein the content of the plasticizer in the adhesive composition is 0.1-50 wt. %, based on the total weight of the adhesive composition.

13. Aqueous adhesive composition according to claim 1, comprising 1-60 wt. % thermoreversible gelling starch, based on the total weight of the composition.

14. Aqueous adhesive composition according to claim 1, comprising 5-80 wt. % bonding starch, based on the total weight of the composition.

15. Aqueous adhesive composition according to claim 1, comprising 30-80 wt. % water, based on the total weight of the composition.

16. Aqueous adhesive composition according to claim 1, wherein the composition is a thermoreversible gel.

17. Aqueous adhesive composition according to claim 1, wherein the thermoreversible gelling starch is obtained from an amylose-containing starch, which starch has been treated with amylomaltase.

18. Aqueous adhesive composition according to claim 1, wherein the bonding starch is a low dextrose equivalent maltodextrin having a dextrose equivalent of less than 5.

19. Aqueous adhesive composition according to claim 1, wherein the content of the plasticizer in the adhesive composition is 3-30 wt. %, based on the total weight of the adhesive composition.

20. Aqueous adhesive composition according to claim 1, comprising 3-35 wt. % thermoreversible gelling starch, based on the total weight of the composition.

21. Aqueous adhesive composition according to claim 1, comprising 30-70 wt. % bonding starch, based on the total weight of the composition.

22. Aqueous adhesive composition according to claim 1, comprising 30-70 wt. % water, based on the total weight of the composition.

* * * * *